United States Patent [19]
Basil et al.

[11] Patent Number: 5,344,712
[45] Date of Patent: Sep. 6, 1994

[54] ABRASION RESISTANT SILOXANE COATINGS CONTAINING CERIA

[75] Inventors: John D. Basil, Pittsburgh; Chia-Cheng Lin, Gibsonia, both of Pa.

[73] Assignee: PPG Industries, Inc., Pittsburgh, Pa.

[21] Appl. No.: 546,484

[22] Filed: Jun. 29, 1990

[51] Int. Cl.$^5$ ............................................. B32B 27/36
[52] U.S. Cl. ................... 428/412; 428/429; 428/436; 428/447; 428/451
[58] Field of Search ............... 428/447, 412, 451, 428, 428/429, 436

[56] References Cited

U.S. PATENT DOCUMENTS

| | | | |
|---|---|---|---|
| 4,214,057 | 7/1980 | Ishihara et al. | 525/100 |
| 4,405,679 | 8/1983 | Fujioka et al. | 428/216 |
| 4,500,669 | 2/1985 | Ashlock et al. | 524/440 |
| 4,571,365 | 2/1986 | Ashlock et al. | 428/412 |
| 4,799,963 | 1/1989 | Basil et al. | 106/287.13 |

FOREIGN PATENT DOCUMENTS 49-003932 of 1974 Japan.

OTHER PUBLICATIONS

*Journal of Non-Crystalline Solids*, vol. 63 (1984) Philipp et al.

*Primary Examiner*—Paul J. Thibodeau
*Assistant Examiner*—R. Follett
*Attorney, Agent, or Firm*—Donna L. Seidel

[57] ABSTRACT

Siloxane organic hybrid polymers and a method of making them by condensation polymerization reaction of organoalkoxysilane in the presence of organic film-forming polymers are disclosed wherein cerium oxide is incorporated for the attenuation of ultraviolet radiation.

6 Claims, No Drawings

ABRASION RESISTANT SILOXANE COATINGS CONTAINING CERIA

FIELD OF THE INVENTION

The present invention relates generally to the art of organic hybrid polymers of alkoxysilanes, and more particularly to the art of coatings which attenuate ultraviolet radiation.

BACKGROUND OF THE INVENTION

U.S. Pat. No. 4,405,679 to Fujioka etal. discloses a coated shaped article of a polycarbonate type resin of improved abrasion resistance comprising a shaped polycarbonate substrate, an undercoat applied and cured on the substrate, and an overcoat applied and cured on the undercoat comprising a hydrolyzate of an epoxy-containing silicon compound, at least one member of the group of hydrolyzates of organic silicon compounds, colloidal silica and organic titania compounds, and a curing catalyst.

U.S. Pat. Nos. 4,500,669 and 4,571,365 to Ashlock etal. disclose transparent, abrasion-resistant coating compositions comprising a colloidal dispersion of a water-insoluble dispersant in a water-alcohol solution of the partial condensate of silanol wherein the dispersant comprises metals, alloys, salts, oxides and hydroxides thereof.

In the *Journal of Non-Crystalline Solids*, Vol. 63 (1984), Philipp et al. disclose in "New Material for Contact Lenses Prepared From Si- and Ti-Alkoxtdes by the Sol-Gel Process" that it is possible to combine inorganic and organic elements to develop materials with special properties.

U.S. application Ser. No. 07/440,845 filed Nov. 24, 1989, now U.S. Pat. No. 5,231,256 by C. C. Lin discloses organic-inorganic hybrid polymers prepared by polymerizing an organic monomer in the presence of an inorganic oxide sol comprising an organoalkoxysilane having an organic functional group capable of reacting with said organic monomer.

SUMMARY OF THE INVENTION

To combine the mechanical strength and stability of inorganic materials with the flexibility and film-forming ability of organic materials, organic-inorganic hybrid polymers in accordance with the present invention are prepared by hydrolyric condensation polymerization of an organoalkoxysilane in the presence of an organic polymer such as polyvinylpyrrolidone. Cerium oxide is incorporated into the polymer for attenuation of ultraviolet radiation.

DESCRIPTION OF THE PREFERRED EMBODIMENTS

Commercial abrasion-resistant coatings for stretched acrylic either contain colloidal silica and exhibit poor resistance to corrosion by solvents such as acetone and sulfuric acid, or are based on relatively soft organic polymer systems such as urethanes or melamines.

The hydrolysis of silanes, particularly an organoalkoxysilane of the general formula $R_xSi(OR')_{4-x}$ wherein R is an organic radical such as alkyl or acrylic-functional groups, R' is a low molecular weight alkyl group, preferably methyl, ethyl, propyl or butyl and x is at least one and less than 4, such as methyltrimethoxysilane, dimethyldiethoxysilane and γ-methacryloxypropyltriethoxysilane and mixtures thereof, can be carried out under controlled conditions in the presence of appropriate additives, and produces stable, clear solutions that exhibit excellent adhesion to unprimed stretched or cast acrylic. Cured coatings, preferably about four microns thick, typically exhibit Bayer abrasion results (i.e., percent haze after 300 cycles of one kilogram load) of 5–10 percent, have a stress crazing time of 17 minutes upon exposure to acetone and 30 minutes upon exposure to 75% sulfuric acid under 3000 pounds per square inch pressure, and remain crack-free for up to 1900 hours of ultraviolet radiation exposure.

Preferably, the silane hydrolyric polycondensation is catalyzed by an appropriate acid which is volatile and which does not lower the pH of the solution excessively. Preferred catalysts include acetic acid and trifluoroacetic acid. The temperature of the hydrolyric polycondensation reaction must be controlled either by external cooling, or by adjusting the solvent and acid composition to control the reaction rate, preferably not to exceed 45° C. A catalyst, preferably sodium acetate, is added to promote complete cure of the siloxane polymer at temperatures preferably in the range of 80° C. A high molecular weight organic polymer, preferably polyvinylpyrrolidone having a molecular weight of at least 300,000, is added to optimize film formation. Colloidal ceria is added for attenuation of ultraviolet radiation. In order to incorporate ceria without forming haze, it is necessary to control the pH of the sol at a relatively high level. This is accomplished by omitting additional acid catalyst for silane hydrolysis and increasing the quantity of sodium acetate. The coated sample is subjected to standard Bayer abrasion testing for 300 cycles, and QUV-B exposure alternating 8 hours of ultraviolet irradiation at 60° C. and 4 hours at 45° C. and 100 percent relative humidity without ultraviolet irradiation. The above invention will be further understood from the description in the specific example which follows.

EXAMPLE I

A solution is prepared comprising 3.0 grams of polyvinylpyrrolidone dissolved in a solution comprising 45 grams of water and 15 grams of aqueous colloidal certa sol. The ceria sol is 20 percent solids, has a pH of 3.2 and is commercially available from Rhone-Poulenc. The polyvinylpyrrolidone has a molecular weight of about 630,000 and is commercially available as K-90 from GAF Corp. A mixture of silanes comprising 105 grams of methyltriethoxysilane and 10.4 grams of dimethyldiethoxysilane is added to the aqueous polyvinylpyrrolidone/ceria mixture at room temperature. No acid catalyst is used. After vigorously stirring the reaction mixture for about one hour, the immiscible aqueous sol and organosilanes mix with the evolution of heat to form a clear orange sol. After another hour of mixing, 50 grams of isopropanol, 25 grams of diacetone alcohol and 0.8 grams of sodium acetate trihydrate are added. The pH of the reaction mixture increases to about 5.0. After further stirring for about 30 minutes, the sol is filtered and applied to either acrylic substrates or polycarbonate substrates treated with an acrylic primer by dip coating for five minutes at room temperature. The coating is air-dried for at least 5 minutes, then cured at 80° C. for 0.5 to 2 hours. The luminous transmittance is 91.5 percent and the haze is 0.5 percent. After 300 cycles of Bayer abrasion testing, the coated samples exhibit only 8 to 12 percent haze, compared with 50 percent haze for uncoated acrylic after the same abrasion testing. After 300 cycles of Taber abrasion testing, the coated samples exhibit 10 to 14 percent haze. The coating withstands 400 to 600 hours of QUV-B313 without cracking, crazing or debonding and with a change in yellowness index (YID) of less than 1, and more than 1200 hours of QUV-540.

The above example is offered to illustrate the present invention. The composition and concentration of the silane, constitution of the alcohol ditluent, concentration and type of the acid catalyst, water contents organic polymer and proportion, ceria sol concentration and proportion, and other reaction conditions may be varied in accordance with the present invention. The abrasion resistant siloxane organic hybrid polymer coating of the present invention containing colloidal ceria for attenuation of ultraviolet radiation may be used on other substrates. The scope of the present invention is defined by the following claims.

We claim:

1. An abrasion resistant and ultraviolet radiation resistant coated plastic transparency comprising:
   a. a rigid transparent plastic substrate; and
   b. a siloxane coating formed from an organoalkoxysilane of the general formula $R_xSi(OR')_{4-x}$ wherein R is selected from the group consisting of alkyl and acrylic-functional groups, R' is selected from the group consisting of methyl, ethyl, propyl and butyl, and x is at least one and less than 4, polyvinylpyrrolidone, cerium oxide and sodium acetate.

2. An article according to claim 1, wherein said polyvinylpyrrolidone has a molecular weight of at least 300,000; and said cerium oxide is colloidal cerium oxide.

3. An article according to claim 2, wherein the rigid transparent plastic is selected from the group consisting of acrylic and polycarbonate.

4. An article according to claim 2, wherein R' is selected from the group consisting of methyl and ethyl.

5. An article according to claim 2, wherein R is selected from the group consisting of alkyl and acrylic-functional groups.

6. An article according to claim 8, wherein the ratio of silane to polyvinylpyrrolidone is about 30.

* * * * *

UNITED STATES PATENT AND TRADEMARK OFFICE
CERTIFICATE OF CORRECTION

PATENT NO.   : 5,344,712
DATED        : September 6, 1994
INVENTOR(S)  : John D. Basil and Chia-Cheng Lin It is certified that error appears in the above-indentified patent and that said Letters Patent is hereby corrected as shown below:

Column 4, line 1, claim 6, delete "8" and insert "2".

Signed and Sealed this

Eighth Day of August, 1995

Attest:

BRUCE LEHMAN

Attesting Officer

Commissioner of Patents and Trademarks